United States Patent [19]

Wong-Lam et al.

[11] Patent Number: 5,487,085
[45] Date of Patent: Jan. 23, 1996

[54] TRANSMISSION SYSTEM WITH IMPROVED EQUALIZER

[75] Inventors: Ho W. Wong-Lam; Johannes W. Bergmans, both of Eindhoven, Netherlands; Kevin D. Fisher, Palo Alto, Calif.

[73] Assignee: U.S. Philips Corporation, New York, N.Y.

[21] Appl. No.: 262,726

[22] Filed: Jun. 20, 1994

[30] Foreign Application Priority Data

Jun. 23, 1993 [BE] Belgium ................................ 9300642

[51] Int. Cl.⁶ .................................................. H03H 7/30
[52] U.S. Cl. ........................... 375/230; 375/229; 375/232; 375/233
[58] Field of Search ................................ 375/11, 12, 14; 364/724.19, 724.20; 333/18

[56] References Cited

U.S. PATENT DOCUMENTS

| | | | |
|---|---|---|---|
| 4,186,384 | 1/1980 | Acker | 375/11 |
| 5,119,401 | 6/1992 | Tsujimoto | 375/14 |

OTHER PUBLICATIONS

Lucky, "Techniques for Adaptive Equalization of Digital Communication System" The Bell System Technical Journal, Feb. 1966. pp. 256–286.

Hong, "Adaptive Equalization Circuit", IBM Technical Disclosure Bulletin, vol. 23, No. 11, Apr. 1981, pp. 5064–5065.

Nagaraj, "An Automatic Line Equaliser Working Down to 0–db Loss", J. Instn. Electronics & Telecom. Engrs., vol. 26, No. 12, 1980 pp. 595–598.

Wood et al., "An Experimental Eight–Inch Disc Drive With One–Hundred Mega–bytes Per Surface", IEEE Transactions on Magnetics, Vo. MAG-20, No. 5, Sep. 1984, pp. 698–702.

Primary Examiner—Stephen Chin
Assistant Examiner—Huong Luu
Attorney, Agent, or Firm—Michael E. Marion

[57] ABSTRACT

In a digital transmission system comprising a transmitter (2) connected to a receiver (6) through a channel (4), this receiver comprises an equalizer (8) which includes an equalization filter (12) with output signals from which a sum weighted with weight factors is determined. The output signal of the equalizer is applied to a detector. According to the inventive idea a correction signal for correcting the coefficients w of the equalizer is derived from $w_k = w_{k-1} + M\hat{a}_k e_k$, where $\hat{a}_k$ is the vector of a plurality of successive detected symbols, and $e_k$ is a difference between the current input signal of the detector and a reconstructed ideal input signal of the detector.

11 Claims, 3 Drawing Sheets

TRANSMISSION SYSTEM WITH IMPROVED EQUALIZER

BACKGROUND OF THE INVENTION

The invention relates to a digital transmission system comprising a transmitter coupled to a receiver through a channel, the receiver comprising an equalizer for deriving a detection signal from an input signal of the receiver, a detector for deriving the detected symbols from the detection signal, and the equalizer comprising an equalization filter for deriving at least two equalization signals, combining means for determining the detection signal which is a combination of equalization signals weighted with weight factors, the equalizer also including adapting means for adapting the weight factors in response to a correction signal belonging to a specific weight factor which correction signal is derived from a first auxiliary signal associated to the detection signal and from a second auxiliary signal associated to a detected symbol.

The invention likewise relates to a receiver for such a system.

A system as defined in the opening paragraph is known from the journal article "Techniques for Adaptive Equalization of Digital Communication Systems" by R. W. Lucky in The Bell System Technical Journal, February 1966.

Transmission systems of this type may be used, for example, for transferring digital symbols through the public telephone network or for reconstructing digital symbols coming from a magnetic tape or disc.

When digital symbols are transmitted via a transmission medium or stored on a recording medium, the symbols to be transmitted or recorded respectively, are converted into analog pulses which are fed to the transmission medium or recording medium respectively, further to be referenced by the term of channel.

Generally, the analog pulses are provided not to overlap in time. If the channel has a limited bandwidth, the pulses will start to overlap which will often lead to the fact that a signal received at a specific instant does not only depend on a single data symbol, but also on symbols adjacent in time. This effect is called intersymbol interference.

In addition to being caused by a limited bandwidth, intersymbol interference may also be caused by the use of a band limiting filter at the transmitter end, which is used to give a desired shape to the frequency spectrum of the transmitted or recorded analog pulses. In many cases the presence of intersymbol interference will lead to an increased symbol error rate.

A possibility of restricting the increase of the symbol error rate caused by intersymbol interference is the use of an equalizer either adaptive or not. An adaptive equalizer may comprise, for example, a filter having an adjustable transfer, which is inserted between the input of the receiver and the detector. The transfer function for such an adaptive equalizer is adjusted so that the error criterion is minimized. In practice a variety of error criteria is used.

A first error criterion is the minimized mean square error. For this criterion the mean square value of the difference between the detection signal and the detected symbol value is minimized. This is equivalent to minimizing the sum of the intersymbol interference power and the noise power at the input of the detector. A second error criterion is the minimized mean square distortion which is equivalent to a minimization of the intersymbol interference power. Both criteria are equivalent if the noise power is negligibly small.

An error criterion known from said journal article is the so-termed zero forcing criterion, for which a number of values of the impulse response of the combination of channel and equalizer is adjusted to a predetermined desired value. As a result, this impulse response becomes equal to a desired impulse response g(t) within a certain period of time.

In the transmission system known from said journal article the equalizer comprises an adaptive transversal filter whose coefficients are adapted in response to the correction signal, the correction signal being derived from the first and second auxiliary signals. The equalization filter then comprises a plurality of delay elements and the detection signal is obtained by calculating the sum of the equalization filter output signals weighted with a weight factor. For all the equalizer coefficients the first auxiliary signal associated to the detection signal is the difference between the detection signal and the most recently detected symbol value which difference is delayed by one symbol interval, whereas for the different coefficients the second auxiliary signal is formed by detected symbol values delayed over zero, one and two symbol intervals. The zero forcing criterion is used in the equalizer known from said journal article.

The MMSE criterion compared with the zero forcing criterion is advantageous in that convergence to a correct equalizer setting will nearly always occur, whereas, the convergence of the equalizer, if the zero forcing criterion is used, is only guaranteed if the eye pattern for the equalizer is open. In addition, if the MMSE criterion is used, no excessive noise enhancement occurs in channels with spectral zero points, whereas this may occur indeed with the zero forcing criterion. In the commonly used LMS algorithm the MMSE criterion is used.

The zero forcing criterion relative to the MMSE criterion is advantageous in that it is simpler to implement and in that it is less sensitive to changes of the channel gain factor. In addition, with the zero forcing criterion it does not happen that coefficients of the equalizer become very large (coefficient blow up) which may happen in some cases if the MMSE criterion is used.

SUMMARY OF THE INVENTION

It is an object of the invention to provide a transmission system as defined in the opening paragraph, in which the simplicity of implementation of the zero forcing criterion and the convergence behaviour of the MMSE criterion are combined.

For this purpose the invention is characterized in that the adapting means comprise a symbol filter for each weight factor to be adapted for deriving the correction signal, the correction signal being dependent on at least two successively detected symbol values.

When a symbol filter is used, the correction signal depends on more than one symbol value. In the state-of-the-art transmission system the impulse response of the combination of equalizer and channel is adjusted at different instants to a desired value. However, in the transmission system according to the invention a number of weighted sums of the impulse response of the combination of equalizer and channel are adjusted at different instants to a desired value. This modification leads to more freedom of equalizer design. It has appeared that this additional freedom of design has made it possible to achieve a considerably improved convergence behaviour without an appreciably increased complexity. Moreover, the final value of the error signal is smaller than in the state-of-the-art transmission system.

An additional advantage of the transmission system according to the invention is the fact that various types of equalization filters can be used, whereas only transversal filters can be used in the state-of-the-art transmission system.

An embodiment of the invention is characterized in that the impulse response of a symbol filter belonging to a specific branch of the equalization filter is an estimate of the impulse response of the combination of the channel and the associated branch of the equalization filter.

This choice of the impulse response of the symbol filters achieves that the second auxiliary signal coming from a specific symbol filter is an estimate of the equalization signal at the output of the associated equalization filter branch whose weight factor is adapted in response to the output signal of the associated symbol filter. With the MMSE criterion the output signal of the associated branch of the equalization filter is used for determining the correction signal. For the criterion according to the invention an estimate of the output signal of the associated equalization filter branch, which estimate is derived from the detected symbols, is used for determining the correction signal. As a result, the convergence behaviour of the equalizer in the transmission system according to the invention may be expected to be equivalent to the convergence behaviour of an equalizer employing the MMSE criterion. This equivalence between the convergence behaviour of the equalizer in the transmission system according to the invention and the convergence of a system employing the MMSE criterion has been confirmed by simulations.

A further embodiment of the invention is characterized in that an inproduct of the impulse response of each symbol filter and the impulse response of the combination of the channel and the equalizer branch belonging to the associated symbol filter has a non-zero value, and in that an inproduct of the impulse response of each symbol filter and the impulse response of the combination of the channel and an equalizer branch not belonging to the associated symbol filter has a zero value.

By selecting the impulse responses of the symbol filters in this manner, there is achieved that the different weight factors are converged independently, so that the convergence of a specific coefficient does not depend on the value of other coefficients. The inproduct may be understood to mean, for example, an integral from $\infty$ to $\infty$ of the product of the two impulse responses. Such a definition of inproduct is used, for example, in continuous-time implementation of the equalizer.

A further embodiment of the invention is characterized in that the matrix product of the matrix whose rows are formed by the values of the impulse responses of the symbol filters at periodic instants and of the matrix whose columns are formed by an estimate of the values of the impulse responses of the combination of the channel and the equalization filters at periodic instants is proportional to a diagonal matrix.

For discrete-time systems the inproduct may be written as the known vector inproduct. The presence of an equalization filter comprising more than one branch and the presence of more than one symbol filter may provide in this situation that the requirement for independent convergence of the different coefficients is expressed in a matrix.

A preferred embodiment of the invention is characterized in that the diagonal matrix comprises the unit matrix.

If the diagonal matrix comprises a unit matrix, this means that the loop gain is the same for all the control loops, as a result of which there will be an identical convergence rate for all the coefficients.

BRIEF DESCRIPTION OF THE DRAWINGS

The invention will now be further explained with reference to the drawing Figures, in which.

DETAILED DESCRIPTION OF THE PREFERRED EMBODIMENTS OF THE INVENTION

Figure 1:
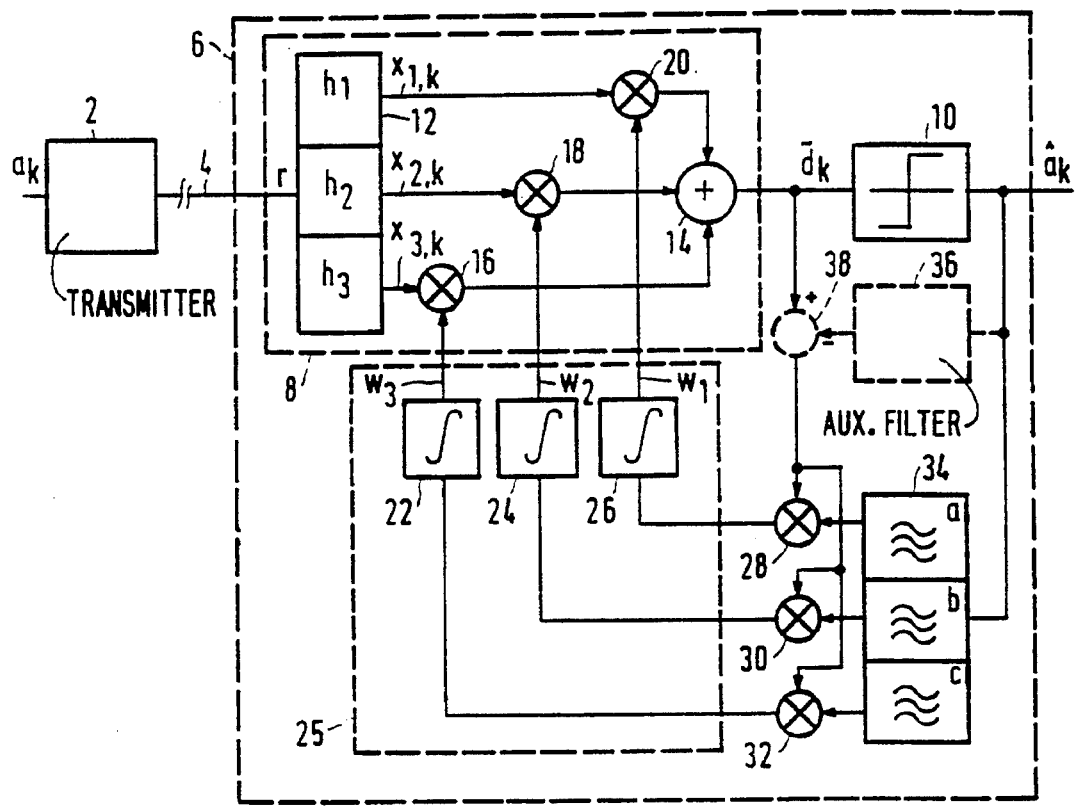
FIG. 1 shows a transmission system according to the invention.

In the transmission system shown in FIG. 1 the symbols to be transmitted $a_k$ are applied to a transmitter 2. An output of the transmitter 2 is connected to the channel 4. The output of the channel 4 is connected to the input of a receiver 6. The input signal of the receiver 6 is applied to an equalizer 8 whose output is connected to a detector 10. The equalizer comprises an equalization filter 12 which derives a plurality of equalization signals from the input signal of the equalizer. The output signals of the equalization filter 12 are combined to the detection signal in combining means comprising here the multipliers 16, 18 and 20 and an adder 14. The weight factors are determined by control signals which are applied to each of the multipliers 16, 18 and 20. The output of the detector 10 is connected to symbol filters 34a, 34b and 34c.

The outputs of the symbol filters 34a, 34b and 34c are connected to a first input of multipliers 28, 30 and 32. A second input of the multipliers 28, 30 and 32 is connected to the first auxiliary signal in this case equal to the detection signal. The first auxiliary signal may also be formed from the difference of the detection signal and a third auxiliary signal derived from the detected symbols by an auxiliary filter 36. The output signals of the multipliers 28, 30 and 32 form the correction signals to correct the coefficients of the equalizer 8. The adapting means 25 comprise integrators 22, 24, 26. The output of the multiplier 28 is connected to a first input of an integrator 26. The output of the multiplier 30 is connected to an input of an integrator 24 and the output of the multiplier 32 is connected to the input of an integrator 22. The output of the integrator 22 is connected to a second input of the multiplier 16. The output of the integrator 24 is connected to the input of the multiplier 18 and the output of the integrator 26 is connected to the second input of the multiplier 20.

The transmitter 2 converts the symbols $â_k$ into pulses that can be transmitted through the channel. The equalizer 8 derives the detection signal from the input signal of the receiver. With a sampled detection signal $$x = Fa \tag{1}$$

may be written in a vector form for the output signals of the equalization filter at the sampling instants of the detection signal. Herein x is the column vector $[x_{1,k}, x_{2,k}, \ldots, x_{n,k}]$ of output signals $x_{1,k}$ to $x_{N,k}$ of the equalization filter, a is the column vector $[a_{k-P}, a_{k-P+1}, \ldots, a_k]$ of the P most recently transmitted symbols a, and F is an N by P matrix whose rows form the successive significant values of samples of the impulse responses $h_i$ of the combination of the channel and the $i^{th}$ branch of the equalization filter at instants situated in the interval 1T, (1+1)T, ..., (u−1)T, uT. For this matrix there may be written:

$$F = \begin{pmatrix} h_1(lT) & \ldots & h_1(uT) \\ \cdot & & \cdot \\ \cdot & & \cdot \\ \cdot & & \cdot \\ h_N(lT) & \ldots & h_N(uT) \end{pmatrix} \quad (2)$$

For the detection signal $\check{d}_k$ it holds:

$$\check{d}_k = (Fa)19\ w^T \quad (3)$$

(3) $w^T$ is the vector $[w_1, w_2, \ldots, w_N]$ of weight factors of the equalization signals in the equalizer 8.

The detector 10 derives the symbols $\hat{a}_k$ from the detection signal. The detector 10 may comprise a simple comparator, but may also be arranged as an MLSE (Maximum Likelihood Sequence Estimation) detector, such as, for example, a Viterbi detector. The symbol filters 34a, 34b and 34c determine the second auxiliary signals in accordance with the inventive idea. A possible choice of the impulse response of the symbol filters 34a, 34b and 34c is proportional to the impulse response of the combination of the channel and the associated equalizer branch.

For a discrete-time implementation the combination of the symbol filters 34a, 34b and 34c may be formed by a more dimensional filter having a vector $\hat{a}$ formed by the N most recent symbols $\hat{a}_k$ as an input signal, and a vector u of samples $u_k$ at the outputs of the symbol filters as an output signal. The output signal vector u is determined according to the inventive idea from:

$$u = M\hat{a} \quad (4)$$

where M is a matrix describing the symbol filter transfer.

The output signals of the symbol filters are multiplied by the signal that corresponds to the detection signal. This may also be the detection signal itself. If the detection signal itself is used care should be taken that at least one of the coefficients of the equalizer is maintained at a fixed value. Otherwise the equalizer may converge to a solution with which all the weight factors are equal to zero, which is obviously not the desired solution.

Alternatively, it is possible to multiply each symbol $\hat{a}_k, \hat{a}_{k-1}, \ldots, \hat{a}_{k-i}$ by the first auxiliary signal and then to form the correction signals by a linear combination of the output signals of the multipliers.

Mostly the signal associated to the detection signal is the difference between the detection signal and an estimate of the desired detection signal determined from the detected symbols by the auxiliary filter 36. The weight factor vector w is determined from the output signals of the multipliers 28, 30 and 32 via integration by the integrators 22, 24 and 26.

It appears that in most channels the convergence rate of the final values of the various weight factors depends on the actual value of other weight factors. In addition, this convergence rate is not the same for all the coefficients. It appears to be possible to transform the matrix M into a matrix $\check{M}$ which leads to an optimum convergence rate which is the same for all the coefficients. In addition, this convergence rate for a specific coefficient is independent of the values of other coefficients. The matrix $\check{M}$ is equal to:

$$\check{M} = \mu(FF^T)^{-1}F \quad (5)$$

where $\mu$ is a constant. Hereinbelow there will be shown that $\check{M}$ satisfies said property.

For the new coefficient vector $w_k$ there may be written:

$$w_{k+1} = w_k + M\hat{a}_k e_k \quad (6)$$

For the error signal $e_k$ between the desired detection signal and the current detection signal there may be written when disregarding noise:

$$e_k = \tilde{d}_k - a^T F^T w_k = \hat{a}^T g - a^T F^T w_k \quad (7)$$

Assuming $a = \hat{a}$ and substituting (6) in (7) while ranging the terms not depending on w in a constant leads to:

$$w_{k+1} = w_k - Maa^T F^T w_k + c \quad (8)$$

The expected value $E[a_k\ a_k^T]$ of $aa^t$ is equal to the autocorrelation matrix $R_a$ of the data $a_k$. If the data symbols $a_k$ are independent, and the power of these symbols is equal to $\alpha$, $R_a$ changes to a scaled version of the unit matrix. For the expected value of (8) the following then holds:

$$E[w_{k+1}] = (\alpha I - MF^T)E[w_k] + c \quad (9)$$

If a convergence is desired to be equally fast for all the coefficients and independent of the other coefficients, the following is to hold:

$$\alpha I - MF^T = \mu I \quad (10)$$

From this it follows that $MFF^T$ it is to be proportional to the unit matrix I. Substitution of (5) in $MF^T$ yields $\mu(FF^T)^{-1}FF^T$, which is equal to $\mu I$.

It is possible to insert between the output of the integrators and the multipliers an element having an exponential transfer. This leads to the fact that the loop gain of the coefficient control loops becomes independent of the amplitude of the input signal of the receiver. In addition, the use of elements having an exponential transfer presents the possibility of inserting an AGC control upstream of the equalization filter.

For example, if assuming a situation in which the output signals of the integrators produce two signals $v_1$ and $v_3$ ($v_2 = 0$), the following will hold for the coefficients $w_1$ and $w_3$:

$$w_1 = e^{v_1};\ w_3 = e^{v_3} \quad (11)$$

It is possible to substitute two independent signals $\beta$ and $-\beta$ for the independent signals $v_1$ and $v_3$ in a control, with a multiplier multiplying the input signal by a value $e^c$ being inserted upstream of the equalization filter. There may be written for the coefficients $w_1'$ and $w_3'$;

$$w_1' = e^c e^{\beta};\ w_3' = e^c e^{-\beta} \quad (12)$$

If the transfer function of the equalizer is to remain the same, the values of $w_1$, $w_1'$ and $w_3$, $w_3'$ respectively, are to be equal. From (11) and (12) it follows that: $c = v_1 + v_3$ and $\beta = v_1 - v_3$. In a matrix form this is:

$$\begin{pmatrix} c \\ \beta \end{pmatrix} = Q \begin{pmatrix} v_0 \\ v_2 \end{pmatrix} = \begin{pmatrix} 0.5 & 0.5 \\ 0.5 & -0.5 \end{pmatrix} \begin{pmatrix} v_0 \\ v_2 \end{pmatrix} \quad (13)$$

Now it is possible to combine this transform with the matrix multiplication $M\hat{a}$. For the adaptation of c and $\beta$ there may be written while utilizing (18):

$$\begin{pmatrix} c \\ \beta \end{pmatrix}_k = \begin{pmatrix} c \\ \beta \end{pmatrix}_{k-1} + \tilde{M}\hat{a}_k e_k \tag{14}$$

with $\tilde{M}=QM$. There is observed that the use of the element having an exponential transfer is only possible if positive values of w will suffice.

Figure 2:
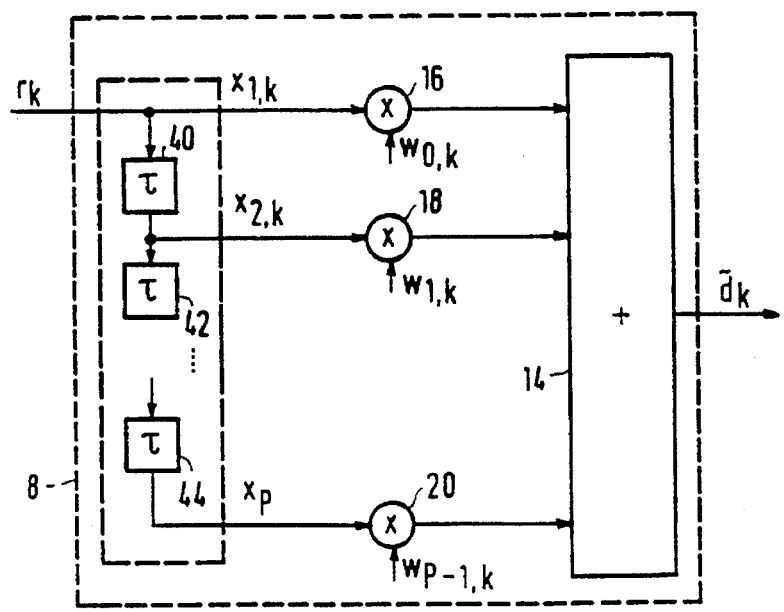
FIG. 2 shows a first embodiment of an equalizer to be used in the transmission system as shown in FIG. 1.

In the transversal equalizer as shown in FIG. 2 the input signal of the receiver is applied to P-1 cascaded delay elements 40 to 44. The equalization filter 12 comprises the delay elements 40-44, the equalization signals being formed by the output signals available on the nodes between the delay elements 40-44. The combining means are formed by the multipliers 16, 18 to 20 and the adder circuit 14.

Figure 3:
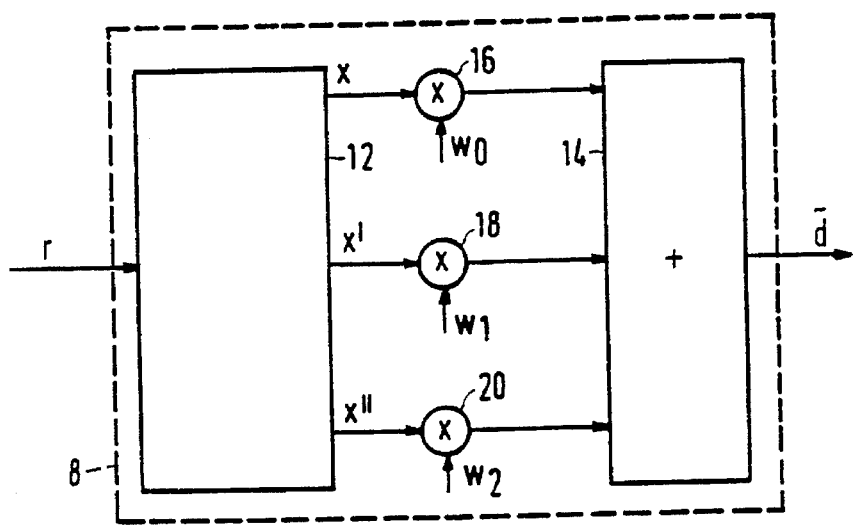
FIG. 3 shows a second embodiment of an equalizer to be used in the transmission system as shown in FIG. 1.

The equalizer as shown in FIG. 3 comprises an equalization filter 12 which determines, in addition to a signal x which is proportional to signal r, a signal x' which is proportional to the first derivative with respect to time r, and a signal x" which is proportional to the second derivative with respect to r. Such an equalization filter is used, for example, for magnetic recording of data signals. The combining means again comprise the multipliers 16, 18, 20 and the adder circuit 14.

Figure 4:
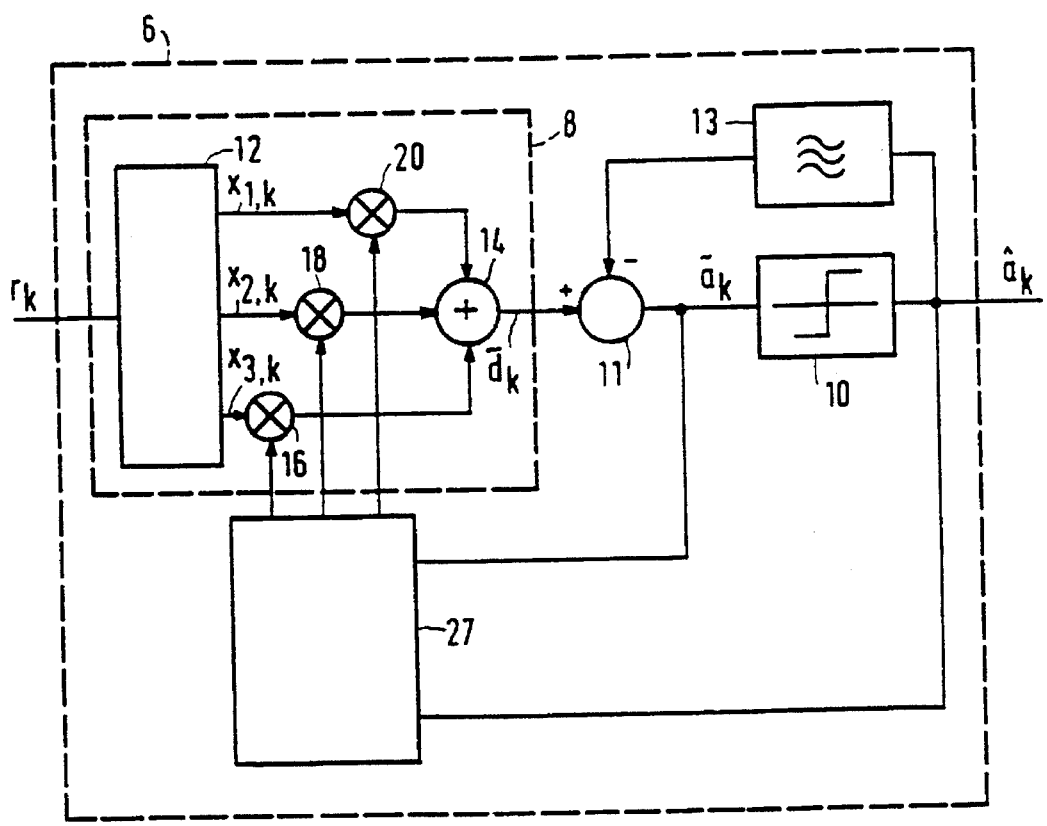
FIG. 4 shows a receiver in which a decision feedback equalizer is used in addition to an improved equalizer.

In the receiver shown in FIG. 4 the input signal $r_k$ is applied to an equalizer 8. The equalizer 8 comprises an equalization filter 12 and weighting means comprising multipliers 16, 18, 20 and an adder circuit 14. The output of the equalizer is connected to a first input of a subtracter circuit 11. The output of the subtracter circuit 11 is connected to a first input of a detector 10 and to a first input of adapting means which comprise the adapting means 27 and the multipliers 28, 30 and 32 of FIG. 1. The output of the detector 10 is connected to the input of a feedback filter 13. An output of the feedback filter is connected to a second input of the subtracter circuit 11.

In addition to an equalizer corresponding to that shown in FIG. 1 the receiver shown in FIG. 4 comprises a decision feedback equalizer formed by the detector 10, the feedback filter 13 and the subtracter circuit 11. The decision feedback equalizer is arranged for removing intersymbol interference which follows the main pulse or main pulses which mainly contribute to the data symbol transfer. Due to the presence of the decision feedback equalizer the intersymbol interference which is removed by the decision feedback equalizer can be disregarded when the equalizer 8 is dimensioned. As a result, the equalizer 8 may have a much simpler structure. There should be observed that as a result of the inclusion of the decision feedback equalizer the manner of adaptation of the equalizer 8 is equal to that of the equalizer shown in FIG. 1.

Figure 5:
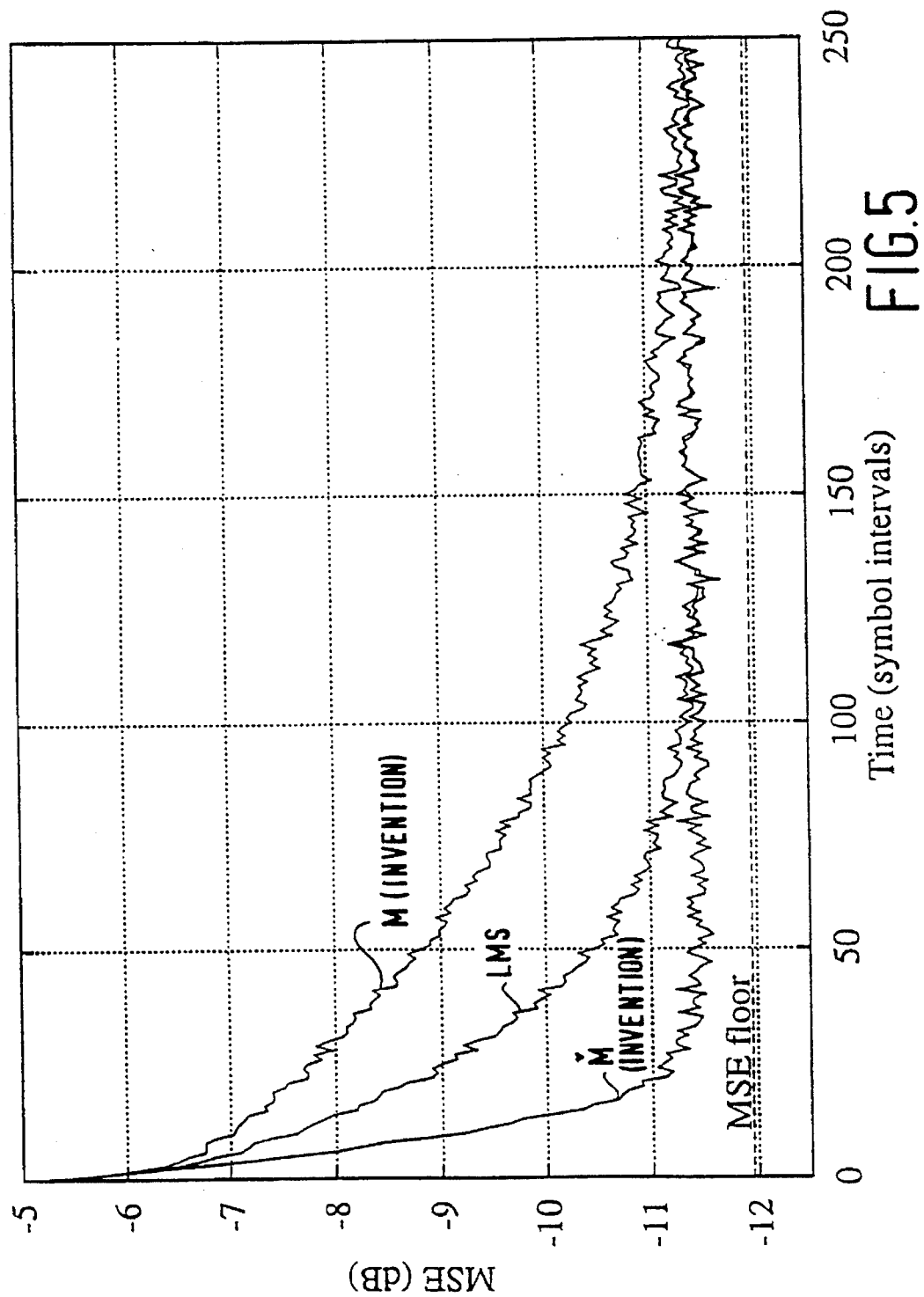
FIG. 5 shows convergence curves of the equalizer in the transmission system according to the invention and of an equalizer employing the MMSE criterion.

FIG. 5 shows the simulated convergence behaviour for a magnetic recording system according to the LMS algorithm and according to the invention.

For these simalations a so-termed Lorentz channel model is assumed for magnetic recording with inductive recording heads and a metallized recording medium. The use of an equalizer as shown in FIG. 3 is also assumed. For the symbol response of a Lorentz channel it holds:

$$h(t) = \frac{A}{1+\left(\frac{2t}{\tau}\right)^2}\left\{\cos\phi + \frac{2t}{\tau}\sin\phi\right\} - \frac{A}{1+\left(\frac{2(t-T)}{\tau}\right)^2}\left\{\cos\phi + \frac{2(t-T)}{\tau}\sin\phi\right\} \tag{15}$$

In (15) t is the time, A is a constant, the $\phi$ is a phase shift, and r is a measure for the pulse width.

If a measure D for the information density is defined as $D=\tau/T$, (15) changes into:

$$h(t) = \frac{A}{1+\left(\frac{2t}{DT}\right)^2}\left\{\cos\phi + \frac{2t}{DT}\sin\phi\right\} - \frac{A}{1+\left(\frac{2(t-T)}{DT}\right)^2}\left\{\cos\phi + \frac{2(t-T)}{DT}\sin\phi\right\} \tag{16}$$

The output signal of a differentiating read head is then proportional to the derivative with respect to time (15). If there is assumed that $\phi$ is equal to zero, the branch producing a signal that is proportional to the derivative of the input signal may be omitted if the equalizer shown in FIG. 3 is used. If equalization of the channel is strived after to obtain a class IV partial response signal, the following will be found for the matrix FT:

$$F^T = \begin{pmatrix} 0.011 & 0.002 \\ 0.019 & 0.001 \\ 0.030 & 0.008 \\ 0.064 & 0.013 \\ 0.135 & 0.078 \\ 0.417 & 0.111 \\ 0.765 & -0.582 \\ 0.000 & 0.000 \\ -0.765 & 0.582 \\ -0.417 & -0.111 \\ -0.135 & -0.078 \\ -0.064 & -0.013 \\ -0.030 & -0.008 \\ -0.019 & -0.001 \\ -0.011 & -0.002 \end{pmatrix} \tag{17}$$

The use of a matrix M which is equal to the matrix F leads to considerable complexity which may be reduced by disregarding insignificant elements of the matrix F. A possible matrix M is then, for example:

$$M = \mu \begin{pmatrix} 0.765 & -0.765 & -0.417 \\ -0.582 & 0.582 & -0.111 \end{pmatrix} \tag{18}$$

This matrix is used in combination with the column vector â which comprises the elements $(\hat{a}_k, \hat{a}_{k-2}, \hat{a}_{k-3})$ used for adapting w. For the matrix $\tilde{M}$ having optimum convergence properties there is found:

$$\tilde{M} = \mu \begin{pmatrix} 0.170 & -0.170 & -1.774 \\ -0.636 & 0.636 & -2.332 \end{pmatrix} \tag{19}$$

For the simulations a signal-to-noise ratio of 15 dB for the detector is assumed, a value of $\mu=0.03$ if the matrix M is used and a value of $\mu=0.038$ if the matrix $\tilde{M}$ is used. In addition, a current channel with D=1.2, is assumed for the simulations, whereas the matrix M is based on a worst case situation with D=2.

FIG. 5 shows the mean square error plotted against the number of transmitted symbols, the initial value of the coefficient $w_1$ (signal x) being half the final value, and the initial value of the coefficient $w_3$ (second derivative of x) being equal to twice the final value. From FIG. 5 it appears that the LMS algorithm shows a faster convergence than the algorithm according to the invention if the matrix M is used, but if the matrix $\tilde{M}$ is used the algorithm according to the invention shows a better convergence. Once again it is noted that the implementation of the LMS algorithm is more complex than the implementation of the equalizer according to the invention.

We claim:

1. A digital transmission system comprising:
   A. a transmitter generating a signal, a receiver, and a channel coupling the transmitter-generated signal to an input of the receiver;
   B. said receiver comprising:
      (a) an equalizer for receiving the signal from the receiver input and for deriving from the received signal a detection signal,
      (b) a detector for receiving and for deriving from the detection signal detected symbols,
      (c) said equalizer comprising: (i) an equalization filter comprising at least first and second branches for deriving at least first and second equalization signals, (ii) combining means for combining the first and second equalization signals weighted with respective first and second weight factors,
      (d) adapting means for adapting the first and second weight factors in response to a correction signal associated with the respective first and second weight factors,
      (e) first means for deriving a first auxiliary signal from the detection signal,
      (f) second means for deriving a second auxiliary signal from the detected symbols,
      (g) third means for combining the first and second auxiliary signals for deriving respective correction signals for the adapting means,
      (h) said second means comprising symbol filters for respective first and second weight factors,
      (i) said correction signals being dependent on at least two successively detected symbol values.

2. Transmission system as claimed in claim 1, wherein the matrix product of the matrix whose rows are formed by the values of the impulse responses of the symbol filters at periodic instants and of the matrix whose columns are formed by an estimate of the values of the impulse responses of the combination of the channel and the equalization filters at periodic instants is proportional to a diagonal matrix.

3. Transmission system as claimed in claim 2, wherein the diagonal matrix comprises the unit matrix.

4. Transmission system as claimed in claim 2, wherein the adapting means comprise an element having an exponential relationship between input signal and output signal.

5. The digital transmission system of claim 1, wherein each said symbol filter for respective first and second weight factors has a first impulse response, and the combination of the channel and respective ones of the first and second branches has a second impulse response, and the first impulse response of the first or second symbol filter represents an estimate of the second impulse response of the combination for the corresponding first or second branch.

6. Transmission system as claimed in claim 5, wherein the adapting means comprise an element having an exponential relationship between input signal and output signal.

7. A digital transmission system comprising:
   A. a transmitter generating a signal, a receiver, and a channel coupling the transmitter-generated signal to an input of the receiver;
   B. said receiver comprising:
      (a) an equalizer for receiving the signal from the receiver input and for deriving from the received signal a detection signal,
      (b) a detector for receiving and for deriving from the detection signal detected symbols,
      (c) said equalizer comprising: (i) an equalization filter comprising at least first and second branches for deriving at least first and second equalization signals, (ii) combining means for combining the first and second equalization signals weighted with respective first and second weight factors,
      (d) adapting means for adapting the first and second weight factors in response to a correction signal associated with the respective first and second weight factors,
      (e) first means for deriving a first auxiliary signal from the detection signal,
      (f) second means for deriving a second auxiliary signal from the detected symbols,
      (g) third means for combining the first and second auxiliary signals for deriving respective correction signals for the adapting means,
      (h) said second means comprising symbol filters for respective first and second weight factors, each said symbol filter for respective first and second weight factors having a first impulse response,
      (i) said correction signals being dependent on at least two successively detected symbol values,
      (j) the combination of the channel and respective ones of the first and second branches has a second impulse response,
      (k) the inproduct of the first impulse response and of the second impulse response of the combination for the corresponding first or second branch having a non-zero value,
      (l) the inproduct of the first impulse response and of the second impulse response of the combination for a noncorresponding first or second branch having a zero value.

8. Transmission system as claimed in claim 7, wherein the adapting means comprise an element having an exponential relationship between input signal and output signal.

9. A digital transmission system comprising:
   A. a transmitter generating a signal, a receiver, and a channel coupling the transmitter-generated signal to an input of the receiver;
   B. said receiver comprising:
      (a) an equalizer for receiving the signal from the receiver input and for deriving from the received signal a detection signal,
      (b) a detector for receiving and for deriving from the detection signal detected symbols,
      (c) said equalizer comprising: (i) an equalization filter comprising at least first and second branches for deriving at least first and second equalization signals, (ii) combining means for combining the first and second equalization signals weighted with respective first and second weight factors,
      (d) adapting means for adapting the first and second weight factors in response to a correction signal associated with the respective first and second weight factors, said adapting means comprising an element having an exponential relationship between a signal received at its input and a signal produced at its output,
      (e) first means for deriving a first auxiliary signal from the detection signal,
      (f) second means for deriving a second auxiliary signal from the detected symbols,
      (g) third means for combining the first and second auxiliary signals for deriving respective correction signals for the adapting means, (h) said second means comprising symbol filters for respective first and second weight factors, (i) said correction signals being dependent on at least two successively detected symbol values.

10. A receiver for receiving digital symbols transmitted through a channel, said receiver comprising:
(a) an equalizer for receiving the signal from the receiver input and for deriving from the received signal a detection signal,
(b) a detector for receiving and for deriving from the detection signal detected symbols,
(c) said equalizer comprising: (i) an equalization filter comprising at least first and second branches for deriving at least first and second equalization signals, (ii) combining means for combining the first and second equalization signals weighted with respective first and second weight factors,
(d) adapting means for adapting the first and second weight factors in response to a correction signal associated with the respective first and second weight factors, said adapting means comprising an element having an exponential relationship between a signal received at its input and a signal produced at its output,
(e) first means for deriving a first auxiliary signal from the detection signal,
(f) second means for deriving a second auxiliary signal from the detected symbols,
(g) third means for combining the first and second auxiliary signals for deriving respective correction signals for the adapting means,
(h) said second means comprising symbol filters for respective first and second weight factors,
(i) said correction signals being dependent on at least two successively detected symbol values.

11. The receiver of claim 10, wherein each said symbol filter for respective first and second weight factors has a first impulse response, and the combination of the channel and respective ones of the first and second branches has a second impulse response, and the first impulse response of the first or second symbol filter represents an estimate of the second impulse response of the combination for the corresponding first or second branch.

* * * * *